J. KENNEDY.
PRESSED METAL EXPANSION SHIELD.
APPLICATION FILED APR. 6, 1915.
1,304,885.
Patented May 27, 1919.
2 SHEETS—SHEET 1.
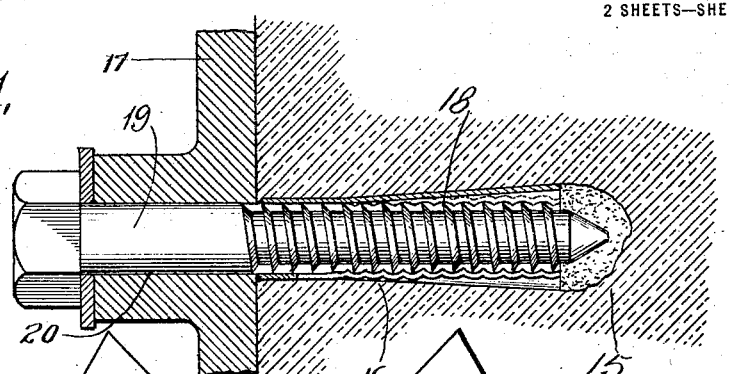
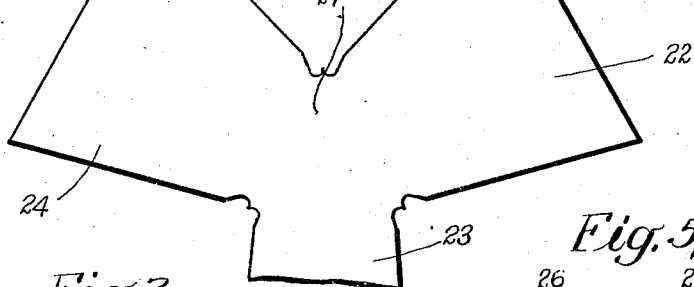
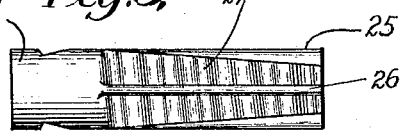
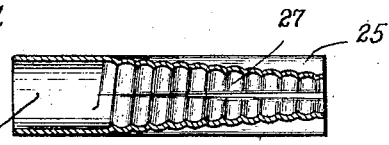
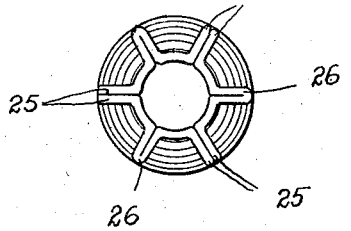
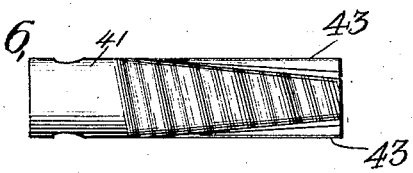
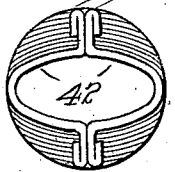
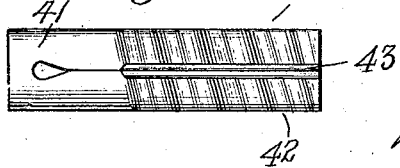
WITNESSES
INVENTOR
Joseph Kennedy
BY
E. W. Marshall
ATTORNEY J. KENNEDY.
PRESSED METAL EXPANSION SHIELD.
APPLICATION FILED APR. 6, 1915.
1,304,885.
Patented May 27, 1919.
2 SHEETS—SHEET 2.
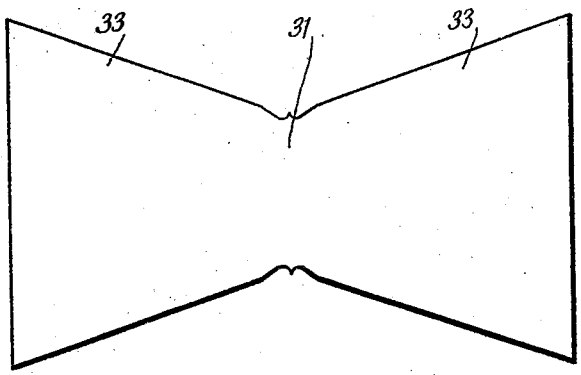
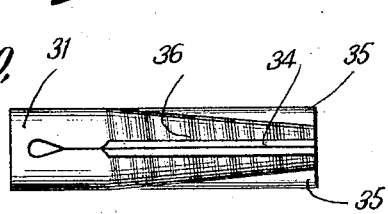
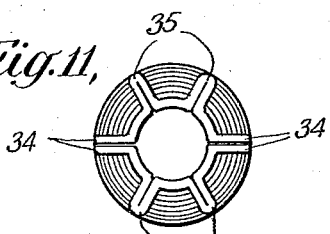
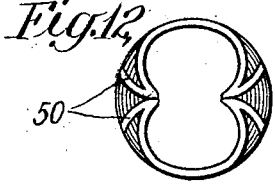
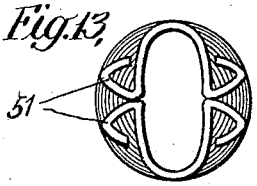
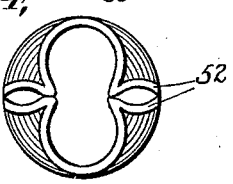
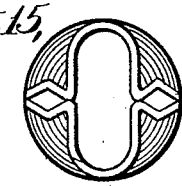
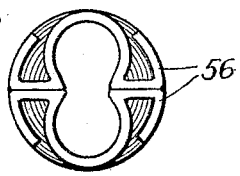
WITNESSES
INVENTOR
Joseph Kennedy
BY
E. W. Marshall
ATTORNEY

UNITED STATES PATENT OFFICE.

JOSEPH KENNEDY, OF NEW YORK, N. Y., ASSIGNOR TO THE CLEMENTS COMPANY, OF NEW YORK, N. Y., A CORPORATION OF NEW YORK.

PRESSED-METAL EXPANSION-SHIELD.

1,304,885.  Specification of Letters Patent.  Patented May 27, 1919.

Application filed April 6, 1915. Serial No. 19,523.

*To all whom it may concern:*

Be it known that I, JOSEPH KENNEDY, a citizen of the United States of America, and a resident of New York, county and State of New York, have invented certain new and useful Improvements in Pressed-Metal Expansion-Shields, of which the following is a specification, reference being had to the accompanying drawings, forming a part thereof.

My invention relates to bolt anchors and the like, and has special reference to such as are formed from sheet metal.

One object of my invention is to provide a simple device of the aforesaid character which may be manufactured in large quantities at small cost and which shall be particularly rigid as compared with corresponding devices of the prior art formed of sheet metal of substantially the same thickness.

Another object is to provide an anchor having either rigid folded ribs or flanges, or ribs or flanges which are adapted to be folded by the crowding of the metal between the bolt and the walls of the hole into which the anchor is inserted.

Other objects and advantages of my invention will be set forth hereinafter, and in order that my invention may be thoroughly understood, I will now proceed to describe the same in the following specification, and then point out the novel features thereof in appended claims.

Referring to the drawings:

Figure 1 is a sectional elevation of a bolt anchor arranged and constructed in accordance with my invention in its expanded condition as utilized for holding a bolt or screw in a wall of concrete or other material.

Fig. 2 is a plan view of a blank or stamping from which the anchor of Fig. 1 is formed.

A longitudinal elevation of the anchor is shown in Fig. 3 and a longitudinal section of the anchor in its contracted form, is shown in Fig. 4.

Fig. 5 is an end elevation looking at the same anchor from its inner end.

Fig. 6 is a side elevation, and Fig. 7 is an end elevation of a modification of my invention, the same anchor being shown in plan view in Fig. 8.

Fig. 9 is a view corresponding to Fig. 2, of a blank from which another modification of my invention may be formed.

A front elevation of this anchor is shown in Fig. 10 and an end view in Fig. 11.

End views of still other modifications of my invention are shown in Figs. 12 to 18 inclusive.

Referring first to Figs. 1 to 5 inclusive, 15 represents a wall of concrete, brick or the like in which is formed a hole or opening 16 and to which a body 17 is to be secured. A bolt anchor 18 is inserted in the hole 16 and is expanded by a lag screw or bolt 19 which is screwed into the anchor and extends through a suitable hole 20 in the body 17 to be supported.

The anchor 18 is formed by a punching or stamping process from sheet metal, the metal sheet being first pressed into the form shown in Fig. 2. As here shown it comprises a central body 21 and flaring side members 22, 23 and 24 extending radially from the body. The blank is formed in a die making the body 21 into a thimble and the side members into a tubular extension of the thimble. The end of the thimble is cut off to provide a hole at the outer end of the anchor and transforms the body into a yoke. In the completed anchor each of the side members has flanges 25 at its edges and a central longitudinal rib 26 which is relatively rigid and is formed as shown in Figs. 4 and 5, and transverse corrugations 27 which are adapted to receive the threads of a bolt or lag screw.

The blank or punching shown in Fig. 2 may be shaped in any suitable manner to produce the tubular form shown in Figs. 1, 3, 4 and 5.

The height of the flanges 25 and also of the ribs 26 is gradually increased from the end toward the collar 21 to the opposite end of the anchor and the size of the opening in the tubular anchor gradually decreases as clearly shown in Fig. 4. Consequently, the anchor will fit closely into a cylindrical hole and if a bolt of sufficient size to fit the large end of the anchor is screwed into it, as shown in Fig. 1, the inner end of the anchor is expanded and the ribs 26 and the flanges 25 very forcibly pressed into the walls of the hole in which the anchor is located.

Attention is particularly directed to the fact that the ribs 26 are formed of two thicknesses of metal closely pressed together and consequently are much more rigid than the edge flanges which are of a single thickness. The anchor of my invention which is provided with the ribs 26 is consequently very solidly set in position when expanded.

Instead of a single rib 26 for each branch of the anchor as shown in Figs. 2 and 3, two or more such ribs may be provided; in fact, the anchor itself may be composed of two arms or flaring members as shown in the modification of Figs. 9 to 11 inclusive, to which reference may now be had.

As in the anchor above described, a sheet metal blank is first stamped or punched,—in this case in the form shown in Fig. 9,—and is composed of a similar body 31 and a plurality of radial arms 33. The blank is next formed into a tube closed at one end and the end cut off to provide the open outer end of the anchor. In the completed anchor each of the arms has either plain or toothed flanges 34, a pair of intermediate ribs 35, and corrugations 36 to coöperate with the screw threads of a bolt, and with the inner surface of the hole in which it is to be used.

In the structures described the arms or branches of the anchor are each provided with a flange of a single thickness of metal, and double thickness ribs provided in addition.

In the modification shown in Figs. 6, 7, and 8 the ribs above described are omitted and flanges 43 are formed of two thickness metal in order to reinforce and stiffen them. These flanges constitute ribs and may be employed either in connection with ribs such as the ribs 26 and 35, or without such ribs, but when such ribs are omitted the shape of the anchor is preferably modified to make the opening in the anchor elliptical as shown at 42 or shaped like some other flattened curve instead of circular at its inner end. This specific arrangement forms a part of the subject matter of my copending application, Serial No. 20,619 filed April 12, 1915, and consequently a brief description will suffice in this specification.

Referring to Figs. 6, 7 and 8, the anchor is composed of a collar or yoke 41 at one end, a pair of coöperating arms 42 which have tapered flanges 43, the metal of which is folded back on itself to make them rigid.

The arrangement of parts is such that the opening in the anchor varies in section from a circle at one end to a relatively flat ellipse at the other.

This is peculiar by reason of the fact that the small diameter of the ellipse is in the plane of the division between arms or members of the anchor and consequently, when a screw or bolt is inserted and the anchor expanded the double flanges 43 which are relatively rigid, will be forced firmly into the walls of the opening in which the anchor is inserted.

Furthermore, the resiliency of the sheet metal causes the sides of the anchor forming the ends of the elliptical sections to be forced firmly against the walls of the opening in which the anchor is inserted. Of course, if the metal is sufficiently yielding, the inner end will be forced to assume a substantially circular section when expanded, but the tendency for the anchor to resist this tranformation causes the sides of the arms, as above described, to be forced against the walls of the opening.

Other examples of anchors having flattened curve sections at their inner end are shown in Figs. 12 to 18 inclusive.

The anchor of Fig. 12 has an hour-glass shape at its inner end and is provided with flanges 50 which are not doubled before the anchor is used but are adapted to fold back upon themselves when the anchor is expanded within a hole.

Shown in Fig. 13 is another slightly different arrangement which has ribs 51 that are also adapted to be folded when the anchor is expanded.

Figs. 14 and 15 show anchors with elliptical inner end sections with ribs 52 and 53 respectively which are partially folded before the anchor is inserted and are adapted to be folded closely during expansion.

An example of an anchor with flanges 54 only on one of the members is shown in Fig. 16.

The anchor of Fig. 17 has closely folded ribs 55 which are adapted to be doubled again providing for thickness of metal when the anchor is expanded.

Fig. 18 is included as an example of still another way in which the flanges 56 may be formed.

While the bolt anchors of my invention may be readily formed from commercial sheet metal, such as sheet iron, steel or brass, having a substantially uniform thickness, I have used the term "sheet metal" herein in a broader sense and intend to include not only what is known as sheet metal but also rolled metal such as lead, or cast or wrought metal, such as malleable iron which is adapted to be shaped to produce the desired form.

Various modifications may be effected within the spirit and scope of my invention, and I intend that only such limitations be imposed as are indicated in the appended claims. For example, the construction shown and described of forming the tubular body by bending blanks such as shown in Figs. 2 or 9 longitudinally, is not essential, but somewhat similar results may be obtained by bending a blank transversely to form structures which will embody the invention as defined in some of the claims.

What I claim is:

1. A sheet metal bolt anchor comprising a collar or yoke, and a plurality of integral arms each having an outwardly extending double-thickness folded rib which is adapted to be pressed into the walls of an opening when the anchor is expanded therein.

2. A bolt anchor comprising a tubular sheet metal body having expanding members with flanged edges and a tapered opening, each of said expanding members having longitudinal outwardly extended ribs of double-thickness folded metal which are adapted to be pressed into the walls of an opening when the anchor is expanded therein.

3. A bolt anchor comprising a tubular sheet metal body having a collar or yoke, a plurality of expanding members integral therewith, each having edge flanges and longitudinal outwardly extending ribs of closely doubled metal, said edge flanges and ribs increasing in height toward the inner end of the anchor and the tapered opening decreasing in size toward the inner end of the anchor.

4. A bolt anchor comprising a tubular metal body having expanding members forming a tapered opening decreasing in size toward the inner end of the anchor, each of said expanding members having longitudinal outwardly extending ribs of double-thickness folded metal adapted to be pressed into the walls of an opening when the anchor is expanded therein.

5. A bolt anchor comprising a tubular metal body having expanding members forming a tapered opening decreasing in size toward the inner end of the anchor, each of said expanding members having longitudinal radial flanges extending to enable the anchor to fit into a cylindrical hole and adapted to be folded when the anchor is expanded and intermediate longitudinal outwardly extending ribs of double-thickness folded metal.

6. A one-piece sheet metal bolt anchor comprising a cylindrical collar or yoke, a plurality of arms or members extending toward the inner end of the anchor and formed to provide a tapering bore decreasing in size toward the inner end of the anchor, each of said arms or members having doubled metal ribs extending to enable the inner end of the anchor to fit into a cylindrical hole of size to receive the cylindrical collar or yoke.

7. A bolt anchor comprising a tubular sheet metal body having a plurality of integral arms with the edges of adjacent arms contacting with each other substantially throughout their lengths, constructed to form a tapered opening, and outwardly extending portions of said arms tapered oppositely to the taper of said opening and arranged to be folded over upon expansion to overlapping positions.

8. A bolt anchor comprising a tubular body having a tapering bore adapted to receive the threads of a bolt, with longitudinally folded flanges increasing in height toward the smaller part of the tube to provide excess metal at said smaller part of the tube and adapted to open when a bolt is inserted.

9. A bolt anchor comprising a tubular sheet metal body having a plurality of arms constructed to form a tapered bore, the adjacent edges of said arms being bent outwardly and tapered oppositely to the taper of the bore to provide an excess of metal at the small part of the tube.

10. A bolt anchor comprising a tubular sheet metal body having a plurality of arms constructed to form a tapered bore, the adjacent edges of said arms being bent outwardly and abutting and tapered oppositely to the taper of the bore.

In testimony whereof I have hereunto set my hand this 2nd day of April, 1915, in the presence of two subscribing witnesses.

JOSEPH KENNEDY.

Witnesses:
I. B. MOORE,
E. G. SCHWEING.

Copies of this patent may be obtained for five cents each, by addressing the "Commissioner of Patents, Washington, D. C."